(No Model.) 2 Sheets—Sheet 1.
J. BAY.
TOILET GLASS.
No. 349,333. Patented Sept. 21, 1886.
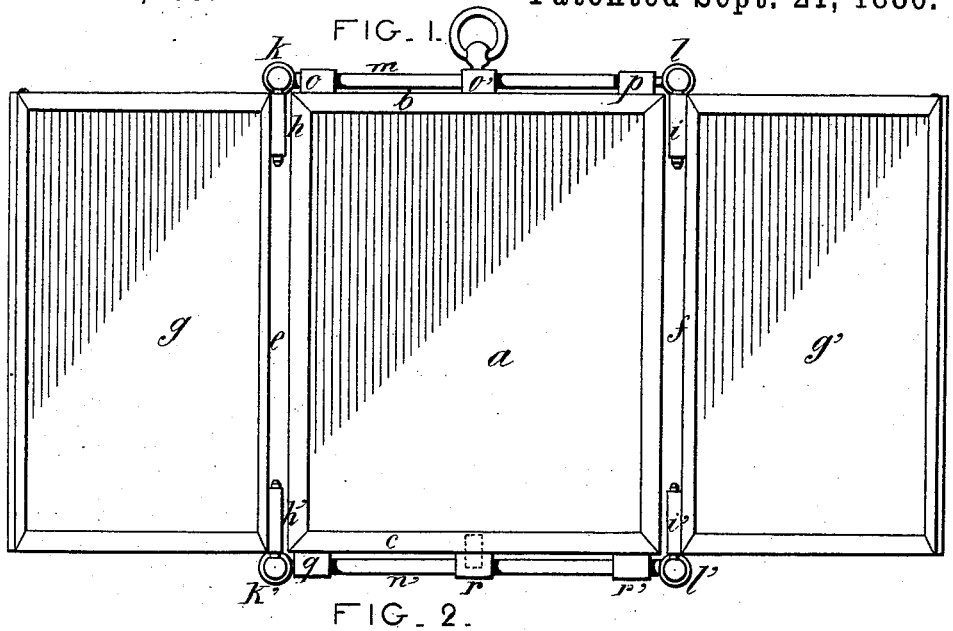
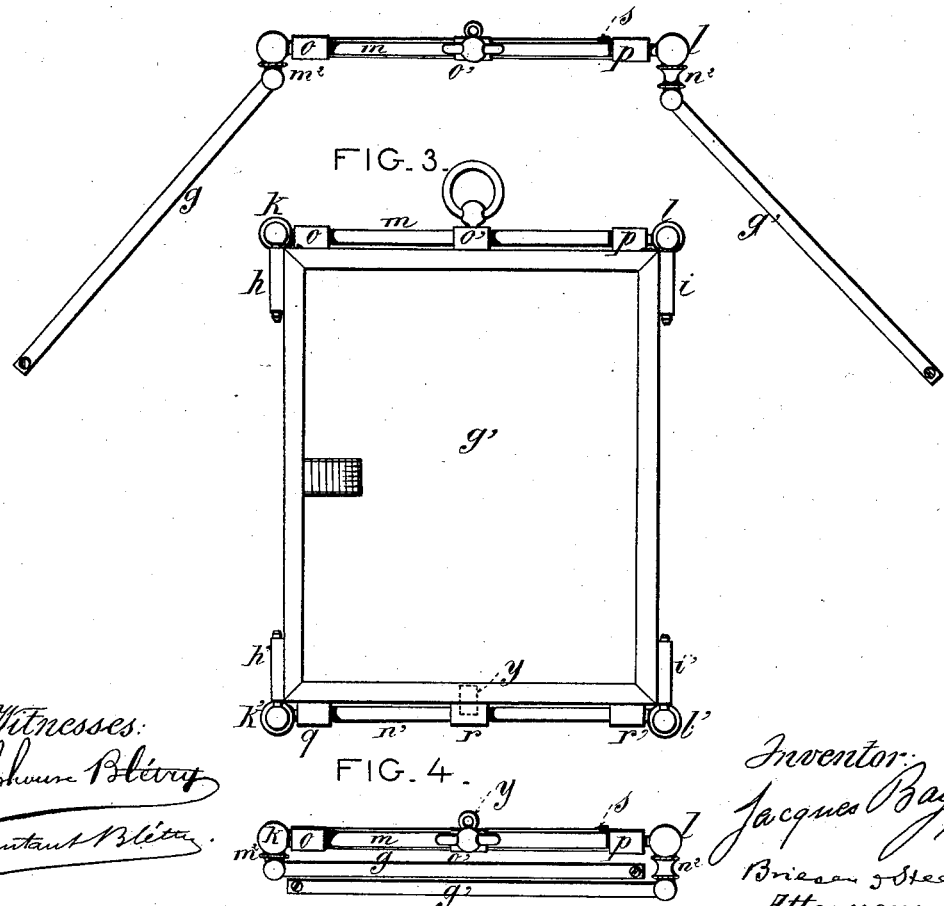
Witnesses:
Alphonse Blétry
Constant Blétry
Inventor:
Jacques Bay
Briesen & Steele
Attorneys.

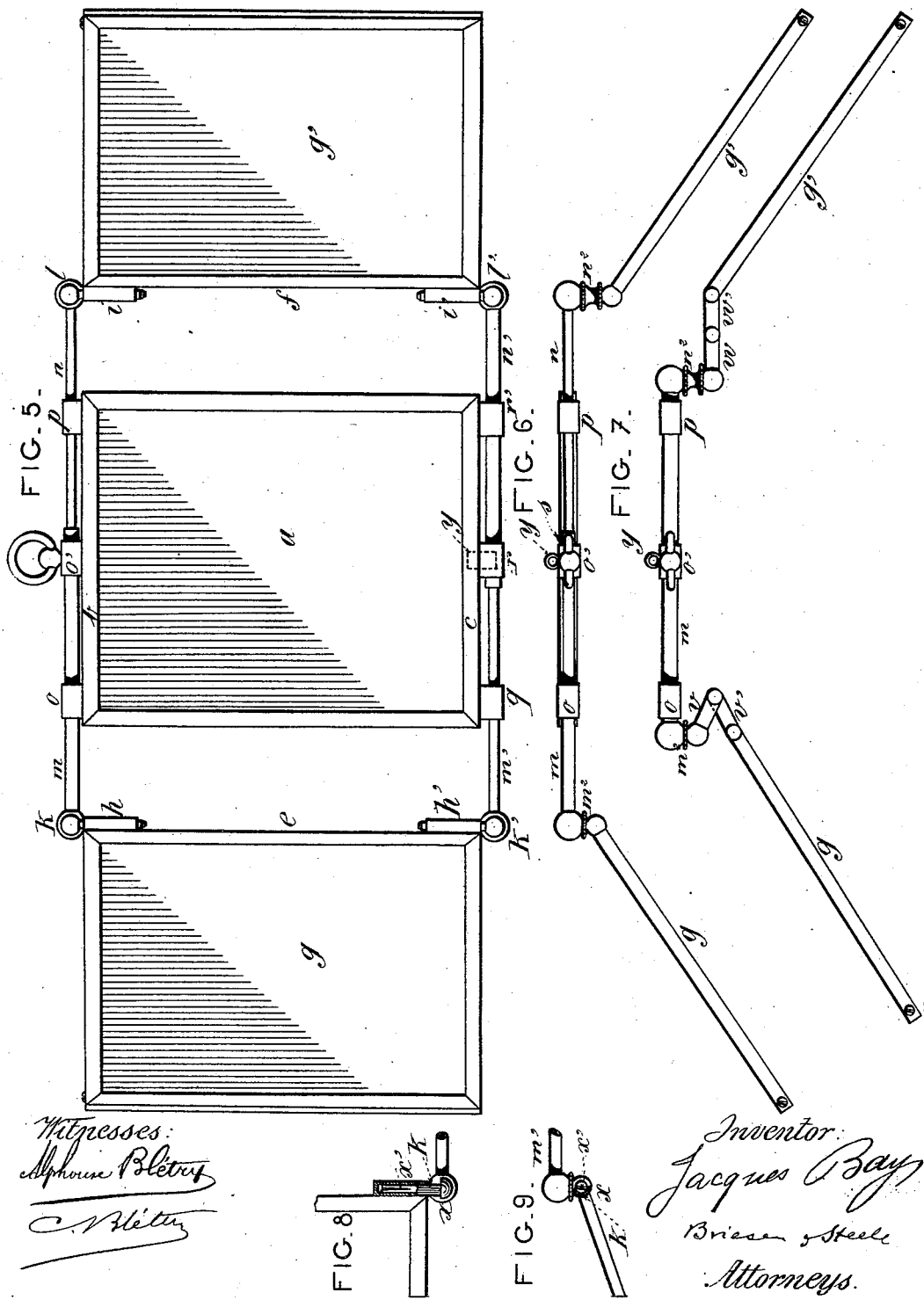

UNITED STATES PATENT OFFICE.

JACQUES BAY, OF PARIS, FRANCE.

TOILET-GLASS.

SPECIFICATION forming part of Letters Patent No. 349,333, dated September 21, 1886.

Application filed June 1, 1886. Serial No. 203,741. (No model.) Patented in France October 16, 1885, No. 171,703; in Belgium November 5, 1885, No. 70,747, and in England November 9, 1885, No. 13,563.

*To all whom it may concern:*

Be it known that I, JACQUES BAY, a citizen of France, residing in the city of Paris, in the French Republic, have invented new and useful Improvements in Triple Toilet-Glasses for Showing the Back of the Head, (for which I have obtained a patent in Great Britain, No. 13,563, bearing date November 9, 1885; in France, No. 171,703, dated October 16, 1885, and in Belgium, No. 70,747, dated November 5, 1885,) of which the following is a specification.

The object of this invention is to remedy a defect in the construction of toilet-glasses for showing the back of the head. The improvements relate to those glasses consisting of a central and two lateral mirrors, the drawback to their employment being the want of a simple method of extending the side glasses from the central one and placing them at an appropriate angle. To render such glasses thoroughly effective it is imperative that they should be capable of extension at the least of from forty-five to forty-eight centimeters.
This is effected in the following manner, without either complication of parts or increase in the dimensions of the glass. The side glasses are movable, and being of the same dimensions as the central one fold over it, so that the three combined are of equal proportions and form a neat and compact ensemble when not required for use. In order that the side glasses may be arranged in any desired position when separating them from the central glass by opening them out either partially or completely, they are jointed at their ends by universal or other joint to the rods that are carried by the center glass, and that slide and that telescope in guides one within the other;
or fixed tubes may be attached for the reception of these rods to the upper and lower ends of the stationary glass.

Figure 1 of the accompanying drawings shows a mirror of the description herein referred to before the side glasses are separated or drawn out from the center glass. Fig. 2 is a plan of the same. Fig. 3 shows the mirror closed. Fig. 4 is a plan of Fig. 3. Figs. 5 and 6 are an elevation and plan of the mirror with the side glasses extended or drawn out to the full. Fig. 7 is a plan of a modification of the invention; Figs. 8 and 9 sectional face and plan views, respectively, of the joint between the sliding rod and the side glass.

The center glass, $a$, of curvilinear or rectilinear form is surrounded by a wooden frame; or it may be metal or composition, and may be ornamented in any desired fashion. Near the corners (top and bottom) of the central glass are soldered or otherwise fixed the guides in which the slides attached to the movable glasses are drawn in or out for regulating the position of the side glasses. The movable side glasses, $g\ g'$, are framed in any convenient manner and of such dimensions that when not in use the three glasses can be folded up together. The vertical edges inside, $e\ f$, are provided with sockets $h\ h'\ i\ i'$, to which the ball-joints $k\ k'\ l\ l'$ are connected, as well as to the horizontal rods $m\ m'\ n\ n'$. These joints are intercepted by the arms $m^2\ m^3\ n^2\ n^3$ of suitable length. The shafts or rods $m\ n'$, which are tubular, slide in the guides $o\ o'$ and $r\ r'$. The rods $m'$ and $n$, which are or are not tubular, slide respectively in the guides $p$ and $q$.

The glasses $g\ g'$ are prevented becoming detached from the center one by fixing a stop, boss, or some other equivalent at the end of $m$. In order to limit the pivoting of the glasses $g\ g'$, the sockets $h\ h'\ i\ i'$ are notched, as shown by the Figs. 8 and 9 at $x$.

The glasses $g\ g'$ are made to become stationary in any desired position by causing the shaft to which the joints are connected to produce a certain amount of friction and elasticity. Constructed in this manner the toilet-glass, when required for use, can be completely extended by one or other of the following methods: First, the glass $g$ can be slid by its rods as far as the stop $s$ on the guide $o'$, and then do the same for the other glass, $g'$; secondly, both glasses $g\ g'$ can be simultaneously uncovered from the central glass, $a$, and then be drawn out on their respective slides and guides.

The advantages of this construction over those in present use have already been remarked, the essential feature of the invention being the outstretching and placing of the side glasses at any desired angle where for the time being they are stationary.

Slight modifications—such as the substitution of jointed shafts $v\ v'\ v\ o\ v\ o'$, as shown by Fig. 7, for the rods sliding in hollow tubes, &c., as already described—may be made without departing from the principle.

I do not claim sliding one section which carries a hinged wing into a central section, as shown in Patent No. 227,568; nor do I claim hinging side mirrors to a central mirror, as in Patent No. 324,227.

What I claim as my invention, and desire to secure by Letters Patent, is—

1. The combination of the central mirror, $a$, having loops $o$, $o'$, $p$, $q$, $r$, and $r'$, with the side mirrors, $a\ g\ g'$, sliding rods $m$, $n$, $m'$, and $n'$, and joints connecting said rods with the side mirrors, all arranged substantially as herein shown and described.

2. The combination of the three glass mirrors $a$, $g$, and $g'$ with the sliding rods $n$ and $m'$, sliding hollow rods $m$ and $n'$, and the joints that connect said rods to the side glasses, substantially as herein shown and described.

JACQUES BAY.

Witnesses:
ROBT. M. HOOPER,
ALPHONSE BLÉTRY.